United States Patent [19]

Saitou

[11] Patent Number: 4,852,033
[45] Date of Patent: Jul. 25, 1989

[54] PORTABLE APPARATUS

[75] Inventor: Yoshio Saitou, Ome, Japan

[73] Assignee: Kabushiki Kaisha Toshiba, Kawasaki, Japan

[21] Appl. No.: 67,794

[22] Filed: Jun. 30, 1987

[30] Foreign Application Priority Data

Jun. 30, 1986 [JP] Japan .............................. 61-98838[U]

[51] Int. Cl.⁴ ............................................... G06F 1/00
[52] U.S. Cl. .................................................... 364/708
[58] Field of Search .................... 364/708; 439/67, 77, 439/165

[56] References Cited

U.S. PATENT DOCUMENTS

| | | | |
|---|---|---|---|
| 4,084,213 | 4/1978 | Kirchner | 361/384 |
| 4,497,036 | 1/1985 | Dunn | 364/708 |
| 4,571,456 | 2/1986 | Paulsen et al. | 361/386 |
| 4,730,364 | 3/1988 | Tat-Kee | 16/337 |
| 4,742,478 | 5/1988 | Nigro, Jr. et al. | 364/708 |

FOREIGN PATENT DOCUMENTS

| | | | |
|---|---|---|---|
| 0160418 | 8/1985 | Japan | 364/708 |
| 0225920 | 11/1985 | Japan | 364/708 |

OTHER PUBLICATIONS

"Removable Liquid Crystal Display for a Personal Computer", *IBM Technical Disclosure Bulletin*, vol. 29, #10, pp. 4273-4274, Mar. 1987.

Primary Examiner—Gary V. Harkcom
Assistant Examiner—Dale M. Shaw
Attorney, Agent, or Firm—Oblon, Fisher, Spivak, McClelland & Maier

[57] ABSTRACT

A portable apparatus includes a display device coupled to a housing by means of a hinge mechanism. The display device can be closed such that it is laid on the upper surface of the housing. The portable apparatus comprises a cable-protecting member. This cable-protecting member protects a cable, which electrically connects the housing and the display together and passes through the hinge mechanism. Even if the display device is frequently raised or lowered with reference to the housing, the cable is reliably protected by the cable-protecting member. Therefore, the cable is prevented from being worn away.

18 Claims, 3 Drawing Sheets

PORTABLE APPARATUS

BACKGROUND OF THE INVENTION

The present invention relates to a portable apparatus, such as a personal computer and a word processor, wherein a display device is coupled to a housing by means of a hinge mechanism, so as to permit the display device to be opened or closed with reference to the housing, and, more particularly, to a construction which protects a cable connecting the display device and housing together.

In recent years, various portable personal computers and word processors have come to be commercially available. In many of the apparatuses of this kind, a display device is coupled to a housing by means of a hinge mechanism, so as to permit the display device to be opened or closed. FIG. 1 illustrates how the housing and display device of a conventional portable apparatus are connected together by a cable. As shown in FIG. 1, the conventional portable apparatus comprises keyboard 11 and floppy disk drive unit 12, independently of housing 10. Housing 10 contains printed circuit boards, on which a CPU, a memory, various controllers, etc. are mounted. Display device 30 is coupled to housing 10 by means of hinge mechanism 20 in such a manner that display device 30 can be opened or closed with reference to housing 10. The printed circuit boards, located in housing 10, are electrically connected to display device by use of cable 40, which passes through hinge mechanism 20.

When the above portable apparatus is used, display device 30 is raised such that its display screen faces the operator, by permitting hinge mechanism 20 to rotate, as indicated by the two-dot chain lines in FIG. 1. By raising display device 30 in this manner, the operator can operate keyboard 11 while looking at the display screen of display device 30. When the portable apparatus is not used, display device 30 is closed, with hinge mechanism rotated, such that display device 30 is laid over keyboard 11. Accordingly, the portable apparatus is compact in size. It should be noted that display device 30 of this type of portable apparatus is frequently opened or closed by the operator.

As mentioned above, cable 40, which electrically connects housing 10 and display device 30 together, passes through hinge mechanism 20. When display device 30 is opened or closed, therefore, cable 40 moves right and left within hinge mechanism 20, and is repeatedly bent at end portion 20a of hinge mechanism 20. Therefore, the conventional portable apparatus is faced with problems, in that cable 40 is worn away or is clamped between display device 30 and end portion 20a of hinge mechanism 20.

SUMMARY OF THE INVENTION

An object of the present invention is to provide a portable apparatus comprising a cable-protecting construction which prevents a cable from being worn away and being clamped in the hinge mechanism and which facilitates assembly of the portable apparatus.

In order to achieve this object, there is provided a portable apparatus, comprising:
a housing including a keyboard;
a display device, which is coupled to the housing by means of a hinge mechanism such that the display device can be laid over the keyboard, with its display screen located downward, and raised from the keyboard;
a cable for electrically connecting the housing and display device together, the cable passing through the hinge mechanism; and
a cable-protecting member, formed by a pair of belt-like members, for sandwiching the cable.

BRIEF DESCRIPTION OF THE DRAWINGS

Other objects and features of the present invention will be apparent from the following description taken in conjunction with the accompanying drawings, in which.

DETAILED DESCRIPTION OF THE PREFERRED EMBODIMENTS

Figure 4:
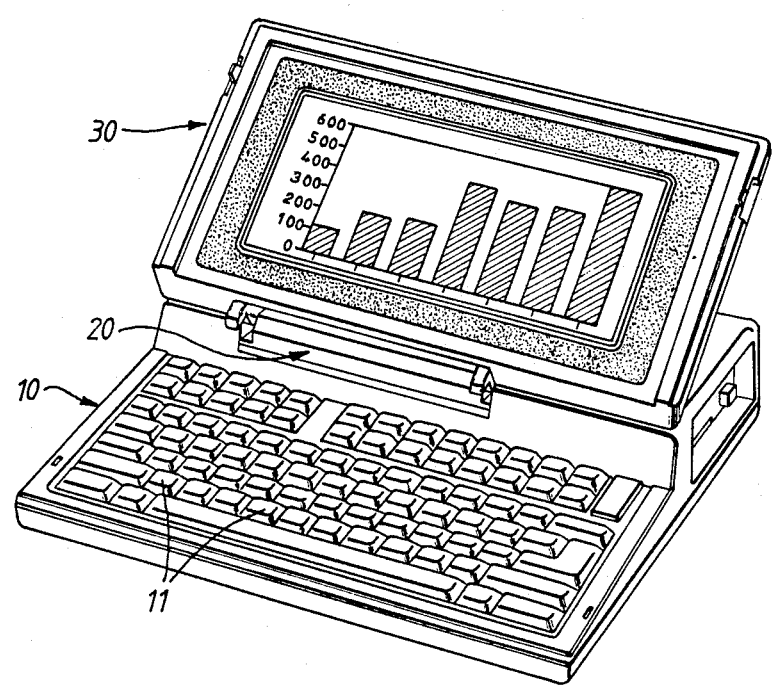
FIG. 4 is a perspective view illustrating the outward appearance of the portable apparatus of the embodiment.

One embodiment of the present invention may be described, with reference to the accompanying drawings. Referring to FIG. 4, housing 10 and display device 30 are coupled to each other by means of hinge mechanism 20. Due to this hinge mechanism, display device 30 can be opened or closed with reference to housing 10. When the portable apparatus is used, display device 30 is opened, as shown in FIG. 4. When the apparatus is not used, display device 30 is closed such that it is laid over keyboard 11.

Figure 1:
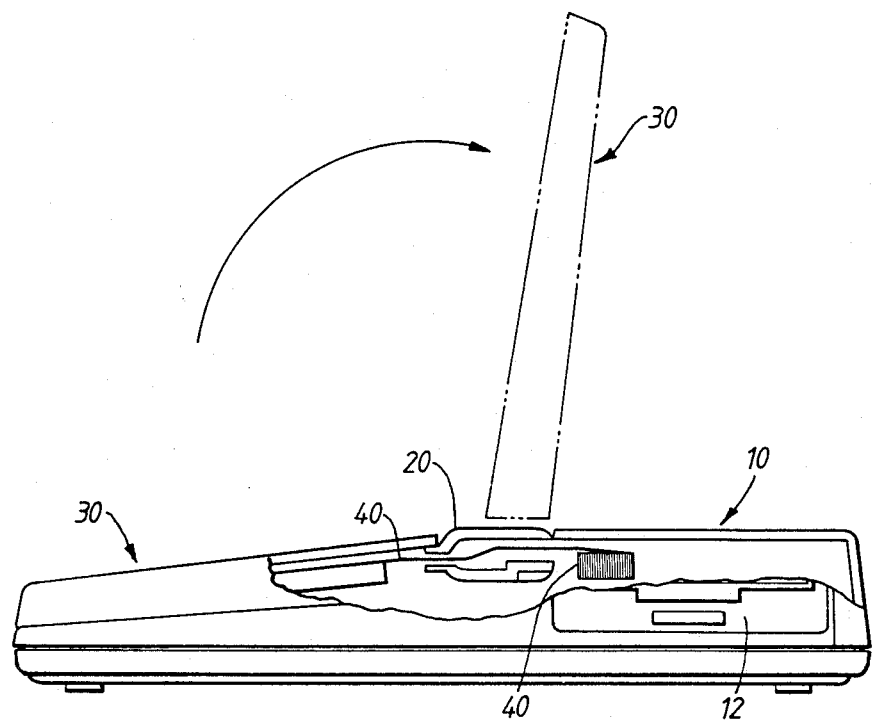
FIG. 1 is a side view illustrating how the housing and display device of a conventional portable apparatus are connected by a cable.
Figure 2:
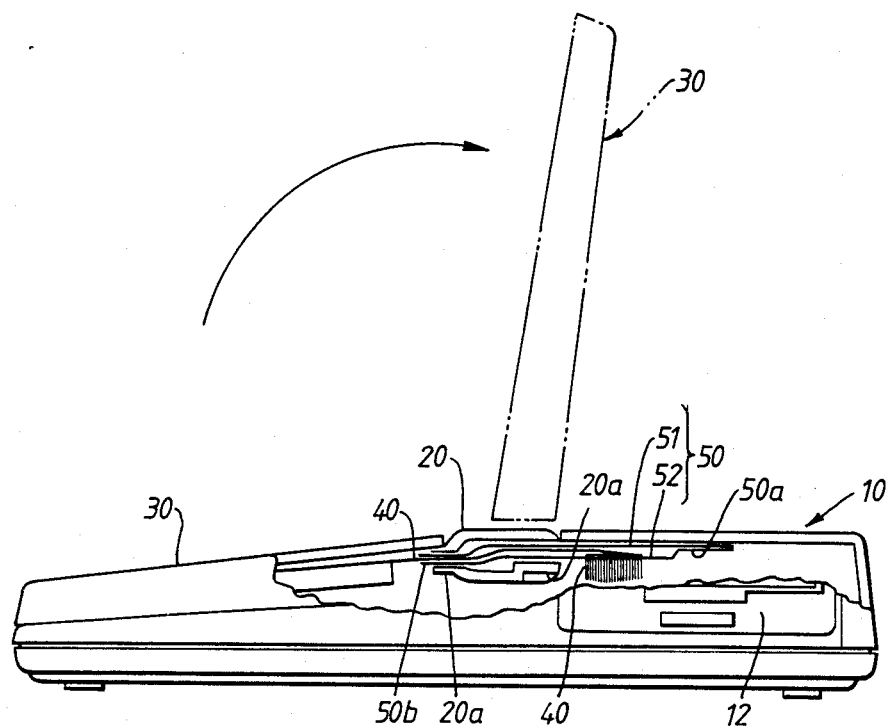
FIG. 2 is a side view illustrating the cable-protecting construction used in the portable apparatus according to one embodiment of the present invention.

FIG. 2 illustrates the cable-protecting construction used in the portable apparatus of the embodiment. The portable apparatus comprises keyboard 11 and floppy disk drive unit 12, which are provided independently of housing 10. A printed circuit board, on which a CPU, a memory, various controllers, etc. are mounted, is located within housing 10. The printed circuit board and display device 30 are electrically connected to each other by cable 40, which passes through hinge mechanism 20.

Figure 3:
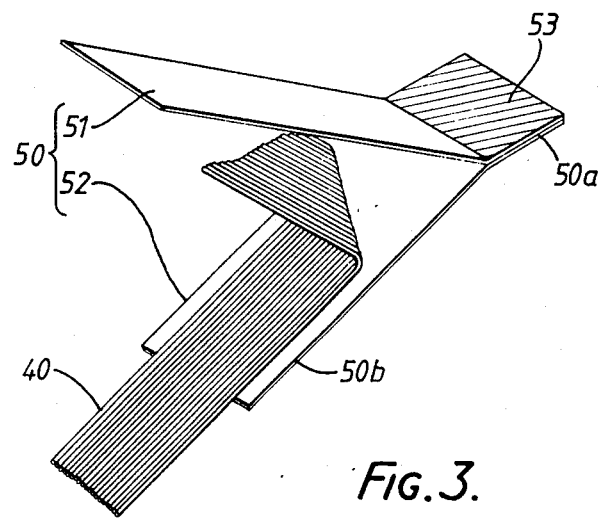
FIG. 3 is a perspective view illustrating the major portion of the cable-protecting construction shown in FIG. 2.

According to the present invention, cable 40, which passes through hinge mechanism 20, is covered with cable-protecting member 50. The construction of this cable-protecting member 50 will be detailed. As shown in FIG. 3, a pair of belt-like members 51 and 52 are put on each other, with cable 40 interposed therebetween. At one end 50a, belt-like members 51 and 52 are fixed to each other by use of an adhesive or the like, so as to prevent them from slipping off each other. Preferably, belt-like members 51 and 52 are formed of a synthetic resin with suitable flexibility and smoothness. In this embodiment, the belt-like members are formed by a polyester film. Each of belt-like members 51 and 52 has a thickness of about 0.2 mm, so as to provide suitable flexibility. To obtain the intended technical advantage, each of belt-like members 51 and 52 has a width equal to or greater than the width of cable 40.

At portion 50a (at which belt-like members 51 and 52 are fixed to each other), cable-protecting member 50 is secured to the inner face of housing 10 by use of adhesive means 53, as shown in FIG. 2. Cable-protecting member 50 is led to display device 30 through hinge mechanism 20, with cable 40 interposed between belt-like members 51 and 52. That end 50b of belt-like members 51 and 52 which is led to display device 30 is an free end.

Cable-protecting member 50 mentioned above ensures smooth movement of cable 40 even if display device 30 is frequently opened or closed. Therefore, cable-protecting member 50 serves to prevent cable 40 from being worn away. Cable-protecting member 50 also serves to satisfactorily prevent cable 40 from being clamped between housing 10 (or display device 30) and end portion 20a of hinge mechanism 20.

If an adhesive double coated tape is used as adhesive means 53, it is only required, during the assembly of the apparatus, that portion 50a be attached to a predetermined location on the inner face of housing 10. Therefore, the assembly of the portable apparatus can be facilitated.

In the above embodiment, portion 50a of belt-like members 51 and 52 is attached to the inner side of housing 10. This method of securing cable-protecting member 50, however, does not limit the present invention. For example, cable-protecting member 50 may be secured at end portion 50b, which is guided to display device 30. In this case, portion 50a, which is located in housing 10, is rendered free. Alternatively, both portions 50a and 50b may be rendered free if each of belt-like members 51 and 52 is fixed in the inside of hinge mechanism 20.

In the above embodiment, cable-protecting member 50 is formed by putting a pair of belt-like members 51 and 52 upon each other. However, cable-protecting member 50 may be formed by folding one belt-like member in half, lengthwise.

In the above embodiments, an adhesive double coated tape is used as adhesive means 53, by which to secure cable-protecting member 50. However, an adhesive, a screw, or other suitable means may be used, replacing the use of the adhesive double coated tape.

What is claimed is:

1. A portable apparatus, comprising:
   a housing containing electronic parts;
   a display device, which is movably connected to the housing by means of a hinge mechanism such that the display device can be laid over an upper portion of the housing, with a display screen located down, and raised from the upper portion of the housing;
   a cable for electrically connecting the housing and the display device to each other, the cable passing through the hinge mechanism; and
   a cable-protecting member for covering the cable which passes through the hinge mechanism, wherein the hinge mechanism has an internal space, through which the cable and the cable-protecting member are guided from the housing to the display device.

2. A portable apparatus as claimed in claim 1, wherein the cable-protecting member includes a pair of belt-like members.

3. A portable apparatus as claimed in claim 2, wherein the two belt-like members connected to each other at one end by adhesive means and which form a coupling means.

4. A portable apparatus as claimed in claim 3, wherein the coupling means, which is at one end of the two belt-like members, is secured to the housing, while the other end of the belt-like members is rendered free.

5. A portable apparatus as claimed in claim 3, wherein the coupled portion, which is at one end of the two belt-like members, is secured to the display device, while the other end of the belt-like members is rendered free.

6. A portable apparatus as claimed in claim 2, wherein each of the two belt-like members is secured to the hinge mechanism within the hinge mechanism, and two ends of the belt-like members, which are located in the display device and the housing, respectively, are rendered free.

7. A portable apparatus as claimed in claim 2, wherein each of the two belt-like members has a width equal to or greater than the width of the cable.

8. A portable apparatus as claimed in claim 1, wherein the cable-protecting member is formed by one belt-like member, the one belt-like member being folded in half, lengthwise, such that cable is sandwiched by the folded belt-like member.

9. A portable apparatus as claimed in claim 1, wherein the cable-protecting member is formed of a smooth and flexible material.

10. A portable apparatus as claimed in claim 9, wherein the material is a polyester film.

11. A portable apparatus, comprising:
    a housing including a keyboard;
    a display device, which is movably connected to the housing by means of a hinge mechanism such that the display device can be laid over the keyboard, with a display screen located down, and raised from the keyboard, wherein the hinge mechanism has an internal space, through which the cable and the cable-protecting member are guided from the housing to the display device;
    a cable for electrically connecting the housing and the display device to each other, the cable passing through the hinge mechanism; and
    a cable-protecting member, formed by a pair of belt-like members, for covering the cable by sandwiching it.

12. A portable apparatus as claimed in claim 11, wherein the two belt-like members are connected to each other at one end by adhesive means and which form a coupling means.

13. A portable apparatus as claimed in claim 13, wherein the coupling means, which is at one end of the two belt-like members, is secured to the housing, while the other end of the belt-like members is rendered free.

14. A portable apparatus as claimed in claim 13, wherein the coupling means, which is at one end of the two belt-like members, is secured to the housing by means of an adhesive double coated tape.

15. A portable apparatus as claimed in claim 12, wherein the coupling means, which is at one end of the two belt-like members, is secured to the display device, while the other end of the belt-like members is rendered free.

16. A portable apparatus as claimed in claim 11, wherein each of the two belt-like members is secured to the hinge mechanism within the hinge mechanism, and both ends of the belt-like members, which are located in the display device and the housing, respectively, are rendered free.

17. A portable apparatus as claimed in claim 11, wherein the cable-protecting member is formed by polyester film.

18. A portable apparatus as claimed in claim 11, wherein each of the two belt-like members has a width greater than the width of the cable.

* * * * *